FIG. I

United States Patent Office
3,035,697
Patented May 22, 1962

3,035,697
APPARATUS FOR SEPARATING FINE-GRAINED SAND
Wilhelm Koch, Faurndau, Wurttemberg, Germany, assignor to Kleemann's Vereinigte Fabriken, Stuttgart-Oberturkheim, Germany
Filed Aug. 7, 1959, Ser. No. 832,311
Claims priority, application Germany Mar. 26, 1959
4 Claims. (Cl. 209—161)

The present invention relates to apparatus for separating fine-graned sand. In the classification of gravels and sands the crude material is usually first treated in washing plant which may be a pure washing device or also have a screening effect. From the washing plant the washed material flows to a special screening unit for classification. This may be a vibratory screen, or a resonant screen, or the like. On these screens the film of dirt which still adheres to the sand is washed off by spraying. Whereas the gravel sizes are taken to storage bins, the coarse sand—between 0 and 3 mm. grain size—together with the washing water flows into a sand collecting plant. However, the muddy water leaving the washing and collecting plants still contains fine-grained sand which can be allowed to settle in clarifying tanks. However, the mud and the sand settle together.

It is the object of the invention in a suitable manner to recover this fine-grained sand from the waste water which contains the mud and other foreign materials, because the fine-grained sand can be usefully employed as an addition to the coarse sand used in the making of concrete.

For separating granular material of different grain sizes from a crude raw material, another known process consists in introducing the material together with the water in which the material is suspended into separatory cones which taper in the downward direction, the suspended material being uniformly distributed across the surface of the filled cone by a centrally located distributor means. In this connection it is also known that the sinking solids can be separated by gravity in a parallel smaller cone inside the larger, so that the heavier larger-sized particles will collect in the inner cone from where they can be withdrawn. The medium and fine-grained material sinks down between the parallel walls of the two interposed cones. In the lower part of the larger cone between the two interposed cones and parallel with their walls is yet another cone in which the fine-grained materials collect and whence these can be withdrawn. However, this known apparatus for separating a mixed material into three different grain sizes is unsuitable for satisfactorily freeing the material suspended in the waste emerging from washing plant, especially gravel processing plant, from the enveloping binding material.

The invention therefore proposes to recover the fine-grained unfreed sand material suspended in the washing water of gravel classification plant, and to free it from the adhering film of mud. According to the invention this is accomplished in that the washing water containing the fine-grained sand is introduced centrally into a separatory cone through inlet means which uniformly distribute the water, that the cone is divided in radial planes into a plurality of cone portions telescopically stacked and interconnected so as to leave peripheral gaps between the adjacent cone portions, said gaps opening into the cone in the downward direction, and in that fresh water in introduced through said gaps and distributed uniformly around the periphery so as to enter the cone substantially in the radial direction for the purpose of washing away the substances which occlude the individual grains of fine sand and of carrying them upwards in a rising current of water inside the cone. The heavier grains of fine sand are able to continue sinking inside the cone, whereas the lighter mud is entrained by the rising current and can overflow in the region of the upper edge of the cone.

According to another feature of the invention the bottom end of the cone has a cylindrical extension in which an annular chamber containing baffles in staggered arrangement is formed in such manner that the sinking grains of fine sand will be subject to turbulent motion and forced to travel downwards along a tortuous path. At the bottom of the tortuous path another stream of water is tangentially injected through an annular gap which opens in the downward direction, said stream of water then flowing upward and likewise entraining particles of mud in its course, whereas the sand which has been opened up by the inflowing fresh water is withdrawn in the downward direction through an outlet opening which can be closed.

According to another feature of the invention water can further be injected into the lower part of the cone through an annulus of nozzles to ensure that the sinking grains of fine sand will be thoroughly flushed. According to the invention the several water admission pipes which feed the tiered openings through which the fresh water enters the cone are controllable by throttling means which are incorporated therein to permit the volumes of water and the speed of flow at the several levels to be adjusted in conformity with given operational circumstances. For putting the apparatus into operation and for inactivating the same only one master shut-off valve need be provided.

Another feature of the invention consists in providing the upper edge of the cone in known manner with slits through which the muddy water and float can evenly and steadily overflow into discharge pipes and be carried away for instance to a clarification plant.

Figure 1:
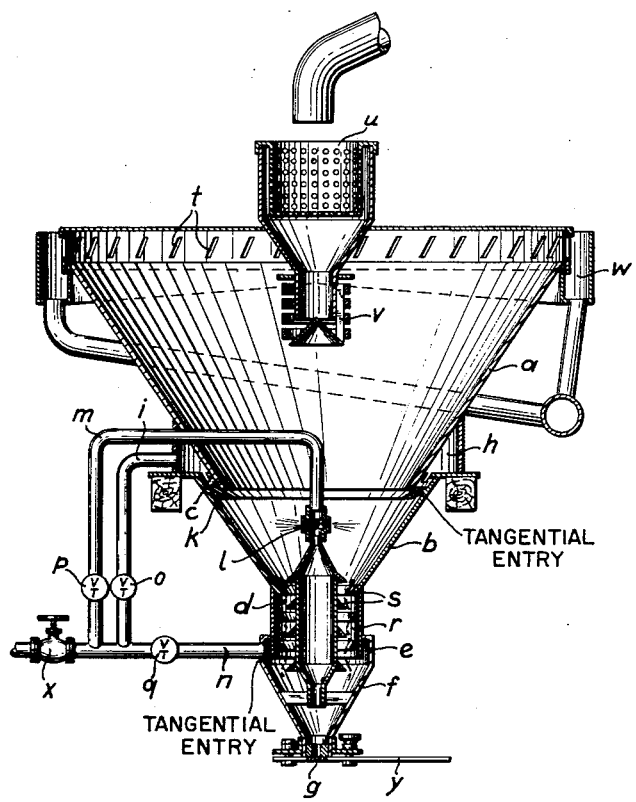
FIGURE 1 represents a vertical axial section of apparatus according to the invention, all parts that are not required for an understanding of the invention being omitted.
Figure 2:
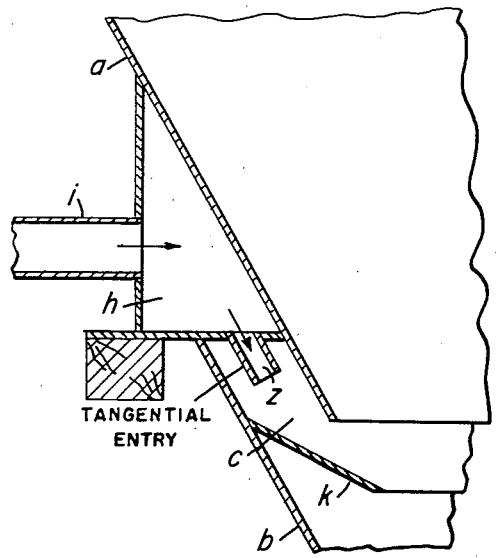
FIGURE 2 illustrates the upper water in-flow structure on an enlarged scale.
Figure 3:
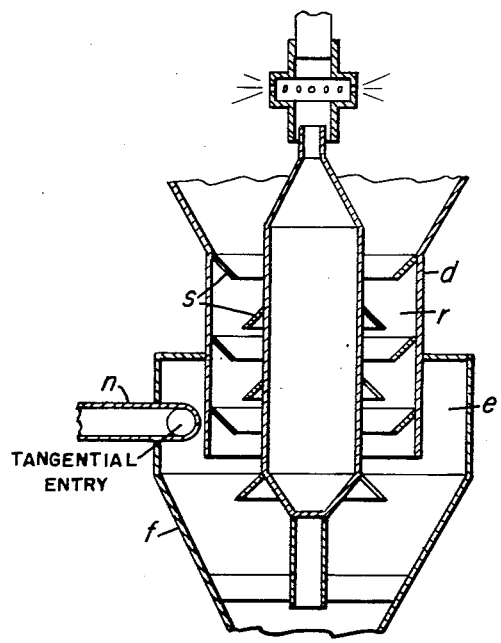
FIGURE 3 illustrates the lower water in-flow structure on an enlarged scale.

The invention comprises an upwardly widening cone-shaped vessel divided into two portions $a$ and $b$ which slightly telescopically overlap to leave an annular gap $c$ which opens into the lower cone portion $b$. The bottom of the lower portion $b$ is extended in the form of a cylindrical portion $d$ which projects into a final cone $f$ so as to leave a further circular gap $e$ between the overlapping parts of $d$ and $f$. At the bottom of the final cone $f$ is an outlet opening $g$. Fresh water admitted through pipe $i$ into an annular chamber $h$ located above the annular gap $c$ flows tangentially into the latter via a plurality of pipes $z$ and is injected into the cone via a cone-shaped deflector ring $k$.

Water is also injected into the cone from a nozzle head $l$ which is fed from pipe line $m$. Moreover, from pipe line $n$ water is tangentially injected into the annular gap $e$. The three pipe lines $i$, $m$, $n$ incorporate adjustable throttling valves $o$, $p$, and $q$. A central member reduces the cylindrical portion $d$ of the cone to an annular chamber $r$ containing relatively staggered intercepting baffles $s$ which restrict the flow section through the cylindrical portion to a zig-zag path indicated by undulating lines in the drawing. The top edge of the cone is preferably provided with obliquely cut overflow slits $t$ through which the muddy water can escape to be collected and carried away through a pipe ring $w$. The mixture of sand and mud which is to be separated is introduced centrally through an inlet head $u$ which has a lower portion $v$ designed to distribute the liquid evenly across the entire surface of liquid inside the cone.

This apparatus functions as will be hereunder explained:

The suspended mixture of sand and mud enters continuously through the distributor head $u$, $v$ at the top of the cone. Simultaneously with the sand and mud mixture currents of water flowing through pipes $i$, $m$, $n$ are injected into the cone through the annular gaps $c$ and $e$ and the nozzle head 1. These water jets give rise to the formation of a rising current inside the cone which in a manner which is already well known gradually loses momentum as the cone section widens in the upward direction. The lighter float and particles of mud are carried aloft by this current. The tangential direction of entry of the flushing water into the annular chamber ensures that this water will emerge from the annular gap $c$ uniformly from around the entire periphery, imparting an additional motion to the liquid and thus removing particles of mud adhering to the grains of sand. This cleansing process continues in the lower cylindrical portion $r$ in the tortuous path defined by the intercepting baffles $s$, so that the fine sand introduced at the top will leave at the bottom together with the fresh water, through the outlet $g$ which is controlled by a gate valve $y$. The volumes of liquid injected through pipes $i$, $m$, and $n$ are controlled by throttling valves $o$, $p$, and $q$ in such a way that according to operational conditions the individual streams will be in appropriate balance, whereas the apparatus can be put into action or inactivated merely by opening or closing a stop valve $x$.

What I claim is:

1. Apparatus for separation of fine-grained sand from waste material in fluid suspension of gravel plants comprising a funnel-like container divided into an upper and lower portion and interconnected to one another, said parts of said container at their interconnection forming an annular channel around said container, a water inlet communicating with said annular chamber for introducing water therein, means in said annular chamber to provide a flow of water from said water inlet tangentially into said container, means to provide a radial deflection of the water toward the middle of the container, concentrically positioned feed inlet means in said container for introducing the fluid waste material into the container to mingle with said water introduced by said water inlet, said lower portion of said container being provided with a cylindrical chamber at its lower end with baffles therein to give the flow of fluid therein a zig-zag path therethrough, and a cone portion at the lower end of said cylindrical chamber having a controllable outlet for removing the water and sand from the container, and overflow means along the top of the container for removing the lighter portions of the fluid waste material.

2. An apparatus for separation of fine-grained sand from fluid waste materials of gravel preparing plants, said apparatus comprising a funnel-like container means, said container means being divided into an upper and lower portion arranged one above the other and interconnected together, annular chamber means surrounding said container at said interconnection, water inlet means to introduce a water flow circumferentially into said chamber, means to distribute the water flow in a tangential direction, annular guide surfaces to deflect the tangentially directed water radially toward the middle of the container, feed inlet means concentrically positioned in said container to introduce the fluid waste material into the container and evenly distribute it therein, a cylindrical chamber at the lower end of said container, said cylindrical chamber having baffle surfaces, a second annular chamber member at the lower end of said cylindrical chamber, another water inlet means communicating with said second annular chamber to introduce water tangentially therein to result in an upward flow, and overflow means along the upper portion of the container for removing the light portions of the waste material in fluid suspension, and means at the bottom of said cylindrical chamber for removing the finely grained sand.

3. Apparatus for separating finely grained sand as claimed in claim 2, wherein an annulus of nozzles is provided in said container for injecting water into the lower portion of the container through said nozzles and causing the sinking grains of sand to be thoroughly flushed and the float to be carried aloft into the current between the feed inlet means and the overflow means at the upper portion of the container.

4. Apparatus for separating finely grained sand as claimed in claim 3, wherein said several water inlet means which feed said annular chambers through which water enters the container further comprise throttling means to permit the volumes of water and the speed of flow at the various levels to be adjusted in accordance with operational requirements, and a master shut-off valve for operating said apparatus.

References Cited in the file of this patent

UNITED STATES PATENTS

| 762,870 | Allen | June 21, 1904 |
| 1,076,666 | Dorr | Oct. 28, 1913 |
| 1,277,145 | Sowers | Aug. 27, 1918 |
| 1,908,102 | Arledter | May 9, 1933 |
| 2,823,801 | Strohl | Feb. 18, 1958 |
| 2,859,872 | Hirst | Nov. 11, 1958 |

FOREIGN PATENTS

| 431,287 | Italy | Feb. 25, 1948 |